Oct. 26, 1965  G. L. DE WOLF  3,214,662
ELECTRO-MECHANICAL OSCILLATION SUSTAINING DRIVE SYSTEM
Filed July 30, 1962
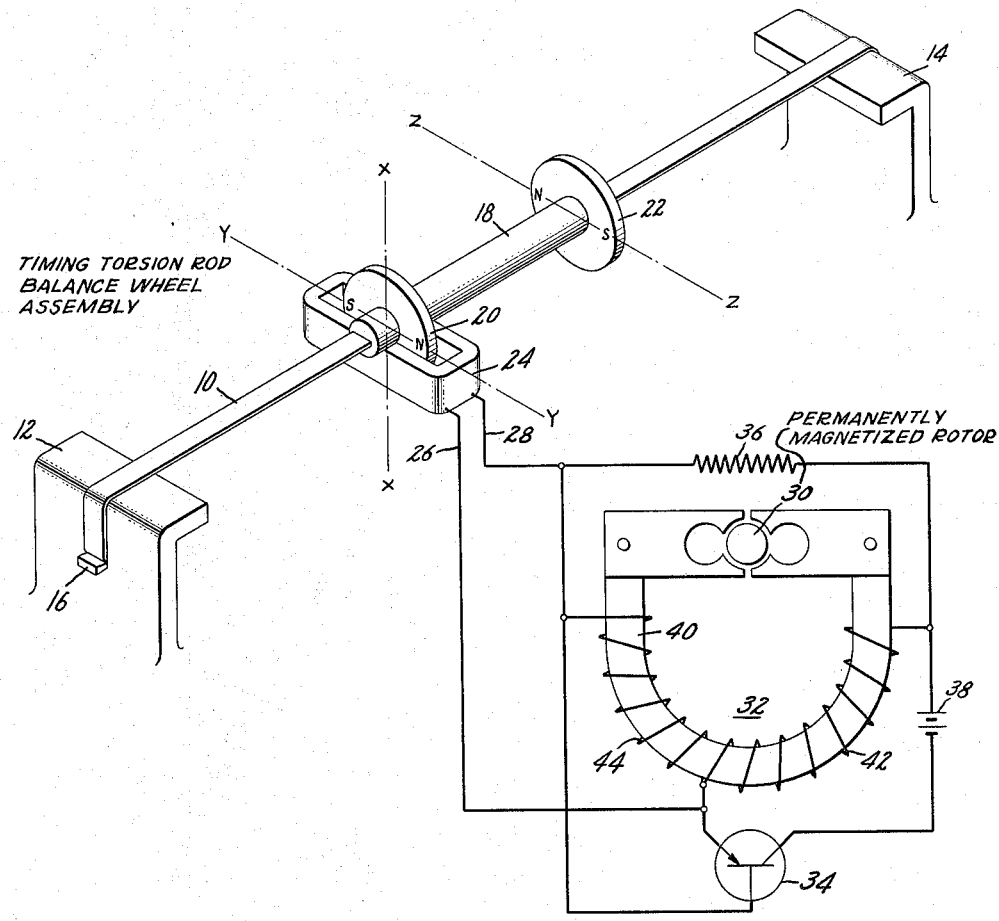
Inventor:
George L. de Wolf,
by Leonard J. Platt
His Attorney.

3,214,662
**ELECTRO-MECHANICAL OSCILLATION
SUSTAINING DRIVE SYSTEM**
George L. de Wolf, Ithaca, N.Y., assignor to General
Electric Company, a corporation of New York
Filed July 30, 1962, Ser. No. 213,340
6 Claims. (Cl. 318—129)

This invention relates to an electro-mechanical system for producing an accurate frequency output and more specifically relates to an arrangement for minimizing or cancelling the effect of any magnetic fields on the frequency output except as specifically intended.

In a co-pending application entitled "Battery Powered Synchronous Motor" by Christie Petrides Serial No. 213,342, filed July 30, 1962, now Patent No. 3,142,012, issued July 21, 1964, and assigned to the same assignee as the present application, there is shown a permanent magnet, D.C. motor having a rate of rotation synchronized with the oscillations of a mechanical oscillator. The oscillator includes an element mounted for torsional oscillation having a permanently magnetized torsion wheel mounted on the element. A coil connected to the motor induces movement of the wheel and the torsion element causing the wheel to oscillate; the oscillating wheel, in turn, induces a signal in the coil on each oscillation. This signal determines the rate of rotation of the motor.

Such a motor and oscillator arrangement is particularly useful in connection with battery powered clocks or timers. In such cases, it is, of course, essential that the torsional oscillator provide a constant frequency output in order to obtain reliable operation of the timing mechanism. In utilizing a magnetic balance wheel, one possible source of error or unreliability is the effect of any stray magnetic fields on the balance wheel. For example, the magnetic field of the earth may affect the frequency of operation of the oscillator so that the frequency may vary as the position of the oscillator relative to the earth's magnetic field is varied.

It is a primary object of the present invention to provide a frequency producing system including a magnetic oscillating member which is not affected by any magnetic fields other than as intended.

Another object of the invention is to provide an arrangement for minimizing or cancelling the effect of the earth's magnetic field on a mechanical oscillator supporting a magnetized wheel.

A further object of the invention is to provide a relatively uncomplicated and inexpensive frequency determining system suitable for accurately controlling the rate of rotation of a D.C. motor.

Briefly stated, this invention relates to a magnetic oscillator including a wire or similar element supported for torsional oscillation and having mounted thereon a magnetic member. A magnetic field positioned in inductive relation with the member causes oscillation of the member and the wire. To counteract the effect on the member of any magnetic fields other than that intended, a second magnetized member is mounted on the wire. Each of the members has a magnetic axis substantially parallel to the axis of the other and of opposite polarity with respect to the polarity of the other. If the members have approximately equal magnetic strength, any stray magnetic field will produce equal but opposite forces on the members so that there is no effect on the oscillation frequency and only the intended field drives the oscillator. The accurate oscillatory output thus produced may be utilized in many different systems to control the frequency of operation.

Further features, objects and advantages will become apparent with reference to the drawing which is a perspective view of the magnetic oscillator of the invention connected to an oscillating motor circuit.

Referring to the drawing there is shown therein a relatively flat torsion element or wire 10 mounted for oscillation between a pair of supports 12 and 14. The wire 10 may be secured to the support by any suitable means such as wedge pins, one of which is shown at 16 secured to support 12. An arbor 18, preferably made of aluminum or other suitable lightweight, non-magnetic material, is shown secured to the torsion wire 10. In accordance with the invention, a pair of permanent magnet masses or wheels 20 and 22 are positioned on the respective ends of the arbor 18. The wheels may be shaped as desired, but are preferably disk-shaped as shown. Each of the wheels may be provided with a north and south pole diametrically spaced. To drive the oscillator, one of the magnetic wheels may be positioned within a periodically changing magnetic field. As an example of one such arrangement, wheel 20 is shown positioned within the air core of a coil 24 so that the disk is free to move within the coil as the torsion wire 10 oscillates. It should be noted that the magnetic axis Y—Y of the wheel 20 is substantially perpendicular to the axis X—X of the field of coil 24. The coil 24 may be connected by means of leads 26 and 28 to a system capable of providing periodic signals to energize the coil.

An example of such a system is shown in the drawing comprising a permanent magnet D.C. motor oscillator circuit including a rotor 30, a stator field and coil assembly 32, a transistor 34, a resistor 36, and a battery 38. The rotor 30 is made of permanent magnetic material magnetized with a plurality of alternate poles around its periphery. The stator field and coil assembly includes a core 40 and a coil intermediately tapped to form a major coil portion 42 and a minor coil portion 44. The major coil portion 42 is serially connected to the emitter-collector terminals of the transistor and to battery 38, and the minor coil 44 is serially connected to the base-emitter terminals of the transistor.

In operation, when the transistor is "on" or conducting, current flows through the field coil inducing a flux in the core 40, which in turn causes the rotor 30 to rotate. The rotating rotor generates signals in minor coil 44 to control the conducting of the transistor by turning the transistor "off" and "on." Although rotor 30 may physically rotate in one direction, it may be considered to be oscillatiing. The rotor would continue to oscillate (or rotate) at its natural frequency if another frequency determining element were not introduced. By connecting coil 24 in parallel with minor field coil 44 and in parallel with the base-emitter terminals of transistor 34, such an external signal may be introduced.

The periodic signals generated in minor coil 44 by rotor 30 will periodically energize coil 24 after each time the transistor has been turned "off" by the signal. As the coil 24 is being energized, the field established interacts with the magnetic field of the balance wheel 20 to impart rotational movement to the wheel, until further motion is resisted by the tension of the torsional element 10. When the signal to the coil 24 is interrupted, the rotational energy stored in the wire 10 will cause it and the balance wheels to oscillate. As the wheel 20 oscillates within the coil 24, the magnetic field of wheel 20 induces a signal within the coil 24 which is transmitted to the motor circuit by the wires 26 and 28. Thus, it can be seen that the wheel 20 in conjunction with coil 24 alternately operates as a motor and a generator. By selecting the parameters of the motor so that its oscillating frequency is close to the frequency of the wheel and coil arrangement, the frequency of the mechanical oscillator may be superimposed on the motor circuit to control the oscillating (rotating) rate of the permanent magnet rotor.

It will be appreciated from the foregoing description, that the magnetic or electro-mechanical oscillator requires only wheel 20 to provide a means for receiving energy to drive the oscillator. However, it has been found that when only wheel 20 is used, the accuracy of the system may be affected by magnetic fields other than that of coil 24. The earth's magnetic field, for example, may introduce one source of error in that the accuracy of the frequency output of the oscillator with only one balance wheel has been found to vary depending upon its geographical location and its particular position or attitude.

In accordance with the invention, providing the second magnetic wheel 22 with its magnetic axis Z—Z positioned 180° out of phase with respect to axis Y—Y of wheel 20 cancels the effect of the earth's magnetic field on the oscillator. Stated more precisely, the magnetic axis of wheel 22 is substantially parallel to the magnetic axis Y—Y of wheel 20, but the polarity of wheel 22 is reversed with respect to wheel 20. Consequently, if the magnetic strength of the two wheels is approximately equal, the earth's magnetic field or any stray field affects the wheels 20 and 22 in an equal but opposite manner. Thus, the addition of magnetic wheel 20 to the oscillator minimizes or cancels any effect of all magnetic fields other than that of coil 24 on balance wheel 20.

It will be appreciated that the torsion element with the pair of magnetic balance wheels provides a relatively uncomplicated and inexpensive arrangement for furnishing an accurate frequency determining system. When connected to a permanent magnet motor circuit, an extremely accurate rotational output is obtained suitable for many uses. For example, an extremely accurate rotational output is particularly useful for driving a clock mechanism. It will, of course, be understood that the particular embodiment described is merely an example of the invention and it will be obvious to those skilled in the art that various changes and modifications may be made without departing from the invention in its broader aspects. Accordingly, it is intended in the appended claims to cover all such variations that fall within the true spirit and scope of the invention.

Having thus described the invention, what is claimed is:

1. A magnetic oscillator including a torsion element mounted for oscillation, a first magnetized mass mounted on said torsion element, means positioned in inductive relation with said first mass to cause oscillation of the mass and the torsion element and to receive signals generated by the mass as it oscillates, and a second magnetized mass mounted on said torsion element, each of said masses having a magnetic axis substantially parallel to the magnetic axis of the other and of substantially opposite polarity with respect to the other so that the effect on the oscillator of any magnetic fields other than that of said inductive means is minimized.

2. An electro-mechanical torsional oscillator comprising a wire supported for torsional oscillation, a first magnetic balance wheel mounted on said wire, means to cause oscillation of the balance wheel and the torsion wire and to receive signals generated by the balance wheel as it oscillates, and a second magnetic balance wheel mounted on said torsion element and spaced from said first wheel and said coil, each of said wheels having a magnetic axis substantially parallel to the other axis and of opposite polarity with respect to the polarity of the other, said wheels having approximately equal magnetic strength so that they cancel the effect on the oscillator of any magnetic fields other than that intended.

3. An electro-mechanical frequency determining system comprising, a torsion wire extending between a pair of supports, a pair of permanently magnetized disk-shaped balance wheels mounted on said torsion wire, each of said wheels having a north and a south pole forming a magnetic axis, said wheels being fixed with respect to each other such that their respective axes are mutually parallel and of mutually opposite polarity, means positioned in flux inducing relation with one of said balance wheels to cause oscillation of the torsion wire and the wheels and to receive signals generated by said one balance wheel as it oscillates.

4. A magnetic oscillator including a torsion element mounted for torsional oscillation, a cylindrically shaped arbor made of non-magnetic material secured on the torsion element to move with the element, a first magnetic mass mounted on said arbor and having a magnetic axis, means positioned in flux inducing relation with said first mass to cause oscillation of the mass and the torsion element and to receive signals generated by the mass as it oscillates, and a second magnetic mass mounted on said arbor and having a magnetic axis substantially parallel to the magnetic axis of the first mass, said axes being of opposite polarity with respect to each other so that the effect on the oscillator of any magnetic field other than that of said flux inducing means is minimized.

5. An electro-mechanical system for controlling the rate of rotation of a direct current synchronous motor comprising an element supported for torsional oscillation, a pair of permanently magnetized wheels mounted on said element, each of said wheels having a north and a south pole forming a magnetic axis, said wheels being fixed with respect to each other such that their respective axes are mutually parallel and of mutually opposite polarity, a direct current synchronous motor circuit including means for producing a magnetic field, said magnetic field being in motion producing relation with one of said wheels to cause oscillation of the torsion element and the wheels, and means for receiving and utilizing the oscillatory output of the torsion element to determine the rotational rate of said motor.

6. A permanent magnet direct current oscillator motor having its rate of rotation controlled by a mechanical-magnetic oscillator comprising a torsion element mounted for oscillation, a permanent magnet mounted on said torsion element, coil means electrically connected to said motor positioned in inductive relation to said magnet to oscillate the magnet and to receive induced signals from said magnet for controlling the rotational rate of said motor and permanent magnet means mounted on said element having magnetic properties for cancelling the effect of any stray magnetic fields on said magnet.

References Cited by the Examiner

UNITED STATES PATENTS

| | | | |
|---|---|---|---|
| 582,090 | 5/97 | Raps | 324—97 |
| 2,843,742 | 7/58 | Cluwen. | |
| 2,905,904 | 9/59 | Sargent. | |
| 2,920,439 | 1/60 | Rich. | |
| 2,959,746 | 11/60 | Sears | 331—110 |
| 2,961,587 | 11/60 | Aeshmann. | |
| 3,014,168 | 12/61 | Thoma | 318—132 |

OTHER REFERENCES

Electrical Engineers' Handbook, Fourth Edition, John Wiley and Sons, Incorporated, New York, 1958. Pages 502–503.

MILTON O. HIRSHFIELD, *Primary Examiner.*